Aug. 31, 1954

C. M. EDWARDS 2,687,593

CROP DUSTER

Filed Nov. 9, 1949

Inventor
Clarence M. Edwards

By Clarence A. O'Brien
and Harvey B. Jacobson
Attorneys

Aug. 31, 1954
C. M. EDWARDS
2,687,593
CROP DUSTER
Filed Nov. 9, 1949
3 Sheets-Sheet 2
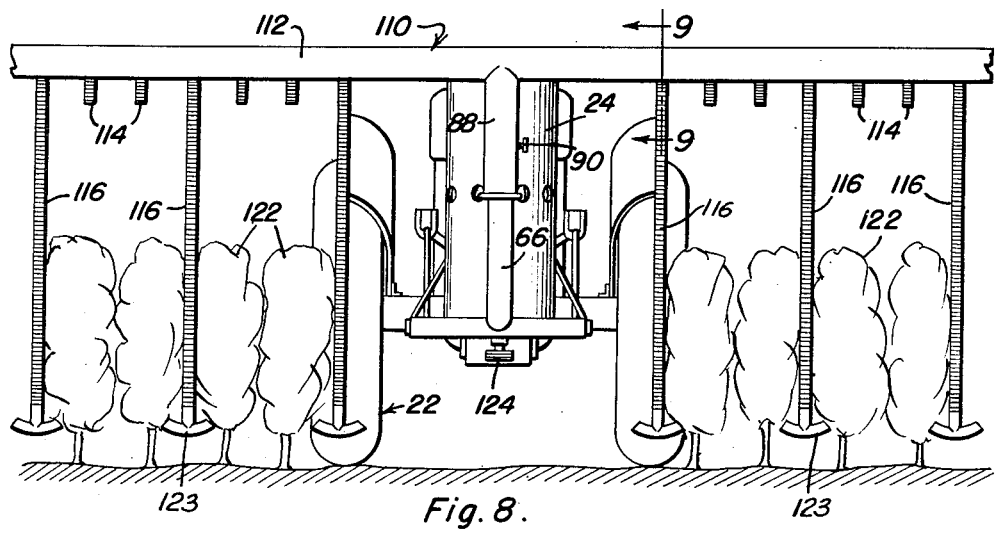
Fig. 8.
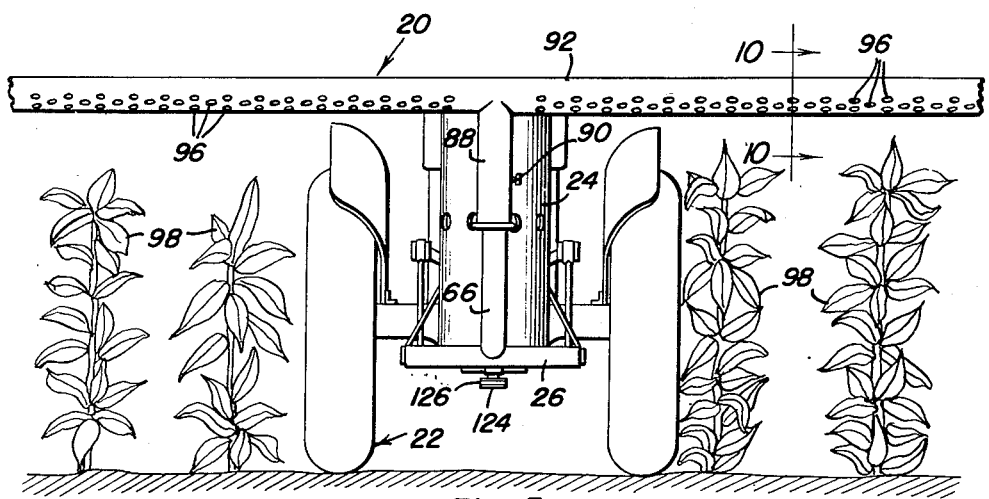
Fig. 3.
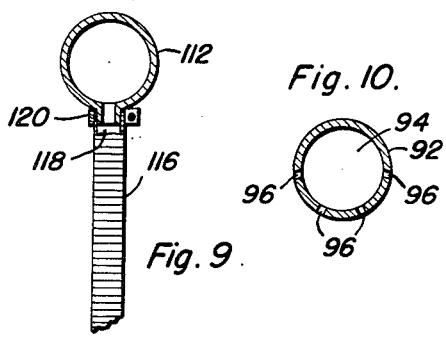
Fig. 9.
Fig. 10.
Inventor
Clarence M. Edwards
By Clarence A. O'Brien
and Harvey B. Jacobson
Attorneys

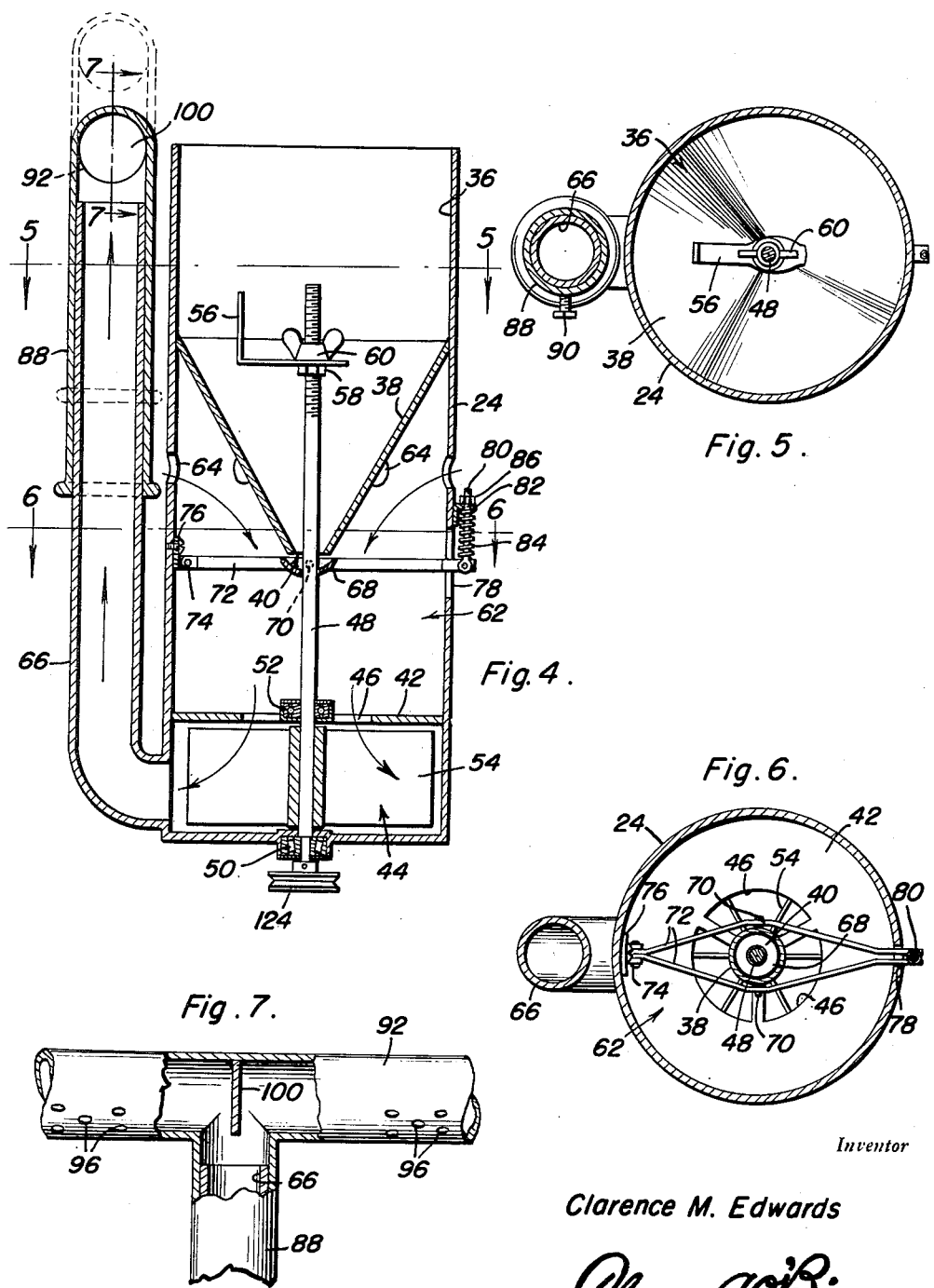

Patented Aug. 31, 1954

2,687,593

UNITED STATES PATENT OFFICE 2,687,593

CROP DUSTER

Clarence M. Edwards, Spring Hope, N. C.

Application November 9, 1949, Serial No. 126,270

3 Claims. (Cl. 43—148)

This invention relates to new and useful improvements and structural refinements in crop dusters, and the principal object of the invention is to expeditiously and efficiently perform the dusting of crops with powdered insecticide, or the like, an important feature of the invention residing in the provision of means for distributing the powder downwardly on the crops from the top as well as upwardly from the bottom so that the powder is deposited on the top as well as bottom surfaces of the leaves.

Some of the advantages of the invention reside in its simplicity of construction, in its efficient operation as aforesaid, in its adaptability for use as an attachment to tractors and similar vehicles, and its adaptability to economical manufacture.

With the above more important objects and features in view, and such other objects as may become apparent as this specification proceeds, the invention consists essentially of the arrangement and construction of parts as illustrated in the accompanying drawings, in which:

Figure 3 is a rear elevational view of the device in operation.

Figure 4 is a vertical sectional view, taken substantially in the plane of the line 4—4 in Figure 1.

Figure 5 is a cross sectional view, taken substantially in the plane of the line 5—5 in Figure 4.

Figure 6 is a cross sectional view, taken substantially in the plane of the line 6—6 in Figure 4.

Figure 7 is a sectional detail, taken substantially in the plane of the line 7—7 in Figure 4.

Figure 8 is a rear elevational view, similar to that shown in Figure 3, but illustrating a modified embodiment of the invention.

Figure 9 is a cross sectional detail, taken substantially in the plane of the line 9—9 in Figure 8; and.

Figure 10 is a cross sectional detail, taken substantially in the plane of the line 10—10 in Figure 3.

Like characters of reference are employed to designate like parts in the specification and throughout the several views.

Figures 1, 2:
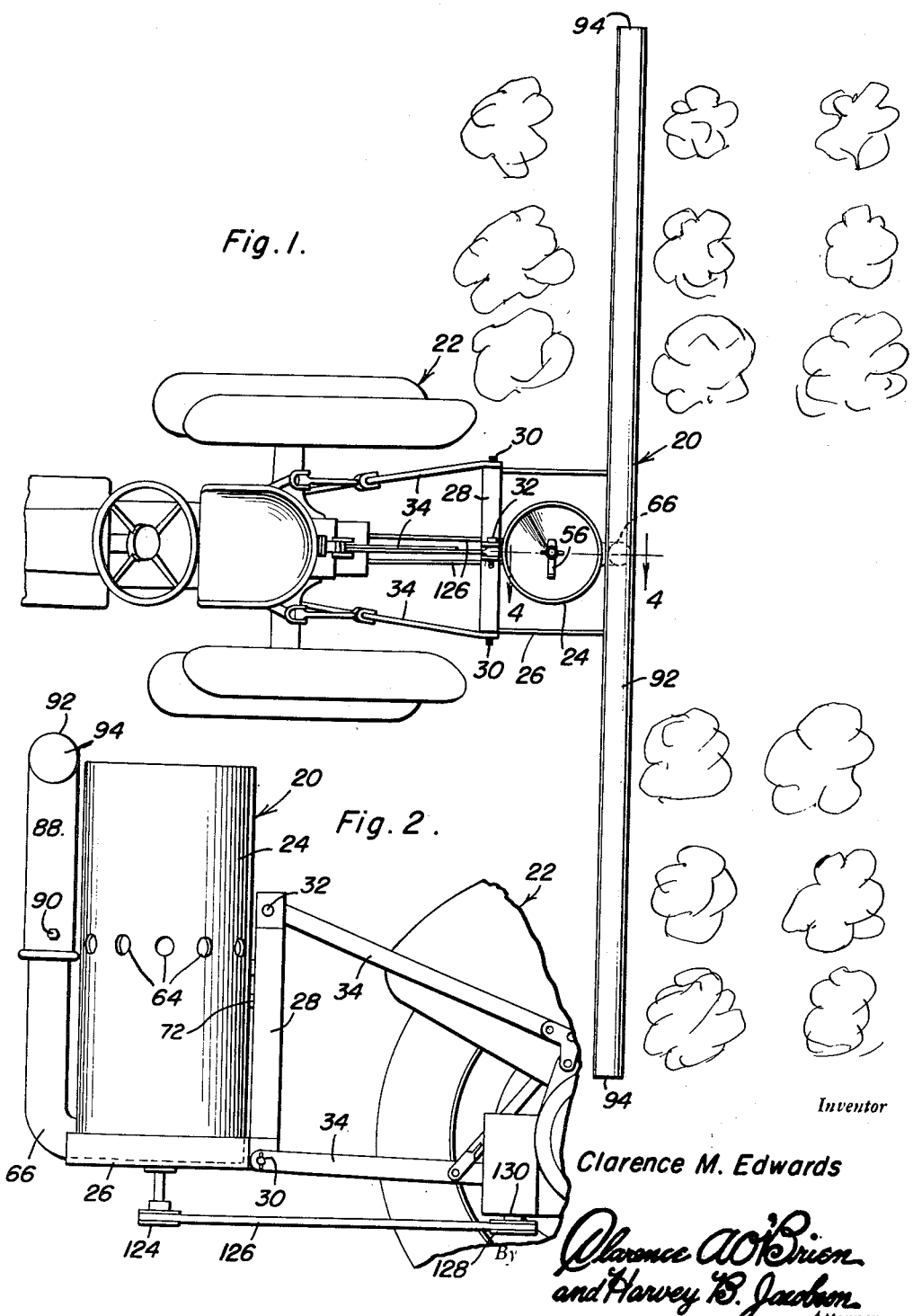
Figure 1 is a top plan view of the invention illustrated as being attached to a tractor.
Figure 2 is a fragmentary side elevational view of the subject shown in Figure 1.

Referring now to the accompanying drawings in detail, more particularly to Figures 1–7 inclusive and Figure 10, the invention is embodied in a crop duster designated generally by the reference character 20 which, in the nature of an attachment, is particularly adapted for use in combination with a tractor 22 or a similar vehicle.

The duster unit 20 embodies in its construction a substantially cylindrical, vertically disposed dust supply tank 24 rigidly mounted upon a suitable platform 26, the latter, in turn, being provided with upstanding brackets 28 (see Figure 2) and being pivotally connected as at 30, 32 to the usual liftable and lowerable linkage 34 at the rear of the tractor 22.

As is best illustrated in Figure 4, the upper end portion of the tank 24 affords a hopper 36 for the dust (powdered insecticide, etc.) this hopper having an inverted frusto-conical bottom 38 which affords at the lower end thereof a discharge opening 40.

A transverse partition 42 is provided in the tank 24 between the bottom of the tank and the bottom of the hopper 36, thus affording a blower fan chamber 44 between the bottom of the tank and the partition 42, substantially as shown.

The partition 42 is provided with a plurality of openings 46 to facilitate communication between the interior of the chamber 44 and the interior of the portion of the tank 24 above the chamber, and a vertical shaft 48 is disposed axially in the tank 24. the lower end portion of the shaft being rotatably journaled in a combined radial and end thrust bearing 50 mounted in the bottom of the tank. while an intermediate portion of the shaft is journaled in a radial thrust bearing 52 supported by the partition 42.

A blower fan 54 is secured to the shaft 48 in the chamber 44, and it is to be noted that the shaft 48 extends upwardly into the hopper 36 through the opening 40, the upper end portion of the shaft carrying a substantially L-shaped agitator 56 which is adjustably mounted on the shaft by a pair of lock nuts 58, 60. The purpose of the agitator 56 is, of course, to agitate or stir the contents of the hopper 36 when the shaft 48 is rotated, so that such contents may flow downwardly through the opening 40 into a mixing chamber 62 which exists in the tank 24 between the hopper 36 and the blower chamber 54.

The chamber 62 is provided in the lateral wall thereof with a plurality of air inlet openings 64 communicating with the atmosphere, and it will be apparent from the foregoing, that when the fan 54 is in operation, air will be drawn into the chamber 62 and will be laden with dust discharging by gravity through the opening 40, after which the dust-laden air will be delivered by the fan 54 into an outlet duct 66 which extends upwardly from the chamber 44 of the tank 24, as shown.

In order to properly regulate the rate of flow of dust through the opening 40 and to facilitate closing of this opening when desired, a circular, dish-shaped closure member or valve 68 is mounted slidably on an intermediate portion of the shaft 48 and is pivotally supported as at 70 between a pair of arms 72 which extend diametrically of the chamber 62 and are pivoted as at 74 to a bracket 76 provided on the inner surface of the side wall of the tank 24. The remaining end portions of the arms 72 project outwardly from the tank through a slot 78 and carry a pivotally mounted pin 80 which is slidable in a bracket 82 provided on the outside of the tank 24, as shown. A suitable compression spring 84 is positioned on the pin 80 between the bracket 82 and the arms 72, whereby the latter are urged downwardly so as to shift the closure member or valve 68 to an open position. However, the extent of opening of the valve may be increased or decreased, or the valve may be altogether closed by simply tightening a nut 86 provided on the upper, screw threaded portion of the pin 80, as will be clearly apparent from Figure 4.

An upward extension 88 is slidably telescoped on the aforementioned outlet duct 66 and a set screw 90, or the like, provided in this extension and frictionally engageable with the duct 66, is employed for adjusting the overall length or height of the assembly. A tubular, horizontally disposed distributing member 92 is connected intermediate the ends thereof to the upper end of the extension 88, this distributing member extending to both sides of the device and having closed ends 94 while the lower portion of the member 92 is provided with a plurality of outlet openings or apertures 96 through which the dust-laden air, delivered by the blower fan 54 through the duct 66, 88, is discharged downwardly from above on the crop 98. If desired, a vertical baffle 100 may be provided in the member 92 centrally above the duct extension 88 (see Figure 7), so as to assure equal distribution of air to both sides or arms of the member 92.

In instances where it is desirable to distribute dust downwardly on the crop as well as upwardly from below so that the dust may be deposited on the top as well as on the bottom of the leaves, a modified embodiment of the invention may be employed, this being illustrated in Figures 8 and 9 and designated by the general reference character 110.

This embodiment is similar to the embodiment 20 already described, with the exception that the horizontal distributing member 112 of the embodiment 110 is provided with flexible outlet pipes 114, 116 which are attached in the manner shown in Figure 8 to short nipples 118 by suitable clamps 120 (see Figure 9), the nipples 118 being provided on the member 112 as shown.

It is to be noted that the ducts or pipes 114 are relatively short and have open lower ends for discharging dust-laden air on the crop 122 from above, while the ducts or pipes 116 are relatively long and are provided at their lower ends with upwardly directed nozzles 124 for discharging dust-laden air upwardly against the under surfaces of the leaves.

Finally, it is to be noted that the entire apparatus is motivated by the tractor 22, the shaft 48 projecting at its lower end from the tank 24 and carrying a pulley, or the like, 124 which is driven through the medium of an endless belt 126 from a similar pulley 128 provided on the usual power take-off shaft 130 of the tractor.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

1. A dust supply tank for crop dusters, comprising a vertically elongated housing having a dust hopper in the upper portion thereof, said hopper being provided with an inverted frusto-conical bottom affording a discharge opening at its lower end, a closure for said discharge opening, a rotatable fan provided in the lower portion of said housing, means for rotating said fan, and an outlet duct extending from the lower portion of the housing, said housing being provided under said hopper with a plurality of air inlet openings, said closure comprising a dish-shaped member, and means for adjusting the position of said closure relative to said discharge opening, said means for rotating said fan including a vertical shaft rotatable in said housing and having the fan secured thereto, said shaft extending through said discharge opening into said hopper, said dish-shaped member being slidably disposed on said shaft below said discharge opening, said adjusting means comprising a pair of arms transversely pivotally mounted in said housing and extending diametrically thereacross, said dish-shaped member being journalled between said arms, and one set of ends of said arms extending through said housing.

2. In a crop dusting machine, a dust supply tank having an outlet duct, dusting means on said outlet duct, said tank comprising a cylindrical housing, an inverted frusto cone shaped hopper secured in the upper portion of said housing, said hopper having a discharge opening at the smaller end thereof, a rotatable fan mounted in the lower portion of said housing for conducting dust to said dusting means, a plurality of air inlet ports on said cylindrical housing between said fan and said discharge opening, a dish shaped closure for said discharge opening, means for vertically adjusting said closure with respect to said discharge opening, said means being operable from the exterior of said housing, mounting means for said closure including a pair of spaced arms extending diametrically across said housing, said closure being disposed between said arms and pivoted thereto, one set of ends of said arms extending through said housing, and said adjusting means being connected to said one set of ends.

3. A dust supply tank for crop dusters, comprising a vertically elongated housing having a dust hopper in the upper portion thereof, said hopper being provided with an inverted frusto-conical bottom affording a discharge opening at its lower end, a closure for said discharge opening, a rotatable fan provided in the lower portion of said housing, means for rotating said fan, and an outlet duct extending from the lower portion of the housing, said housing being provided under said hopper with a plurality of air inlet openings, said closure comprising a dish-shaped member, and means for adjusting the position of said closure relative to said discharge opening, said means for rotating said fan including a vertical shaft rotatable in said housing and having the fan secured thereto, said shaft extending through said discharge opening into said hopper, said dish-shaped member being slidably disposed on said shaft below said discharge opening, said adjusting means comprising a pair of arms transversely pivotally mounted in said housing and extending diametrically thereacross, one set of ends of said arms extending through said housing, said dish-shaped member journalled between said arms, the upper end of said shaft terminating within said hopper, and an agitator fixed to the upper end of said shaft and rotatable therewith.

References Cited in the file of this patent

UNITED STATES PATENTS

| Number | Name | Date |
|---|---|---|
| 555,256 | Monroe | Feb. 25, 1896 |
| 675,179 | Wacker | May 28, 1901 |
| 883,383 | Borden | Mar. 31, 1908 |
| 926,791 | Watson | July 6, 1909 |
| 1,118,286 | Johnson | Nov. 24, 1914 |
| 1,439,461 | Wood | Dec. 19, 1922 |
| 1,674,391 | Dunnagan | June 19, 1928 |
| 1,862,666 | Duncan | June 14, 1932 |
| 2,057,332 | George | Oct. 13, 1936 |
| 2,132,727 | Foote | Oct. 11, 1938 |
| 2,226,136 | Parker | Dec. 24, 1940 |
| 2,237,229 | Johnson | Apr. 1, 1941 |
| 2,336,113 | McLaughlin | Dec. 7, 1943 |
| 2,425,419 | Carnes | Aug. 12, 1947 |
| 2,467,594 | Nichols | Apr. 19, 1949 |
| 2,572,542 | Van Kessel | Oct. 23, 1951 |

FOREIGN PATENTS

| Number | Country | Date |
|---|---|---|
| 354,472 | France | Oct. 6, 1905 |
| 934,683 | France | May 28, 1948 |